United States Patent
Jeong et al.

(10) Patent No.: US 9,309,411 B2
(45) Date of Patent: *Apr. 12, 2016

(54) NACREOUS PIGMENT WITH HIGH CHROMA AND MULTIPLE COLORS AND METHOD OF PREPARING THE SAME

(75) Inventors: Jae-Il Jeong, Cheongju-si (KR); Kwang-Choong Kang, Cheongju-si (KR); Byung-Ki Choi, Chungcheongbuk-do (KR); Kwang-Soo Lim, Cheongju-si (KR); Kil-Wan Chang, Cheongju-si (KR)

(73) Assignee: CQV CO., LTD., Chungcheongbuk-Do (KR)

( * ) Notice: Subject to any disclaimer, the term of this patent is extended or adjusted under 35 U.S.C. 154(b) by 604 days.

This patent is subject to a terminal disclaimer.

(21) Appl. No.: 13/165,824

(22) Filed: Jun. 22, 2011

(65) Prior Publication Data

US 2012/0227627 A1    Sep. 13, 2012

(30) Foreign Application Priority Data

Mar. 11, 2011 (KR) ........................ 10-2011-0021779

(51) Int. Cl.
| | |
|---|---|
| C04B 14/20 | (2006.01) |
| C04B 14/04 | (2006.01) |
| C04B 14/22 | (2006.01) |
| B05D 3/10 | (2006.01) |
| C09C 1/00 | (2006.01) |

(52) U.S. Cl.
CPC ........... *C09C 1/0015* (2013.01); *C01P 2004/03* (2013.01); *C01P 2006/60* (2013.01); *C01P 2006/63* (2013.01); *C01P 2006/64* (2013.01); *C01P 2006/65* (2013.01); *C09C 2200/102* (2013.01); *C09C 2200/1004* (2013.01)

(58) Field of Classification Search
CPC ............ C01P 2004/03; C01P 2006/60; C01P 2006/63; C01P 2006/64; C01P 2006/65; C09C 1/0015; C09C 2200/1004; C09C 2200/102
USPC .......................................... 106/482, 483, 489
See application file for complete search history.

(56) References Cited

U.S. PATENT DOCUMENTS

| | | | | |
|---|---|---|---|---|
| 4,146,403 A | * | 3/1979 | Armanini et al. | 106/418 |
| 6,692,561 B1 | | 2/2004 | Schoen et al. | |
| 6,899,757 B2 | * | 5/2005 | Chang et al. | 106/415 |

(Continued)

FOREIGN PATENT DOCUMENTS

| | | |
|---|---|---|
| DE | 102009037933 A1 | 2/2011 |
| JP | 2003513139 A | 4/2003 |

(Continued)

OTHER PUBLICATIONS

European Patent Application No. 11 170 791.5, Office Action date Jan. 14, 2015, four (4) pages.

*Primary Examiner* — Shuangyi Abu Ali
(74) *Attorney, Agent, or Firm* — Nath, Goldberg & Meyer; Joshua B. Goldberg

(57) ABSTRACT

The present invention relates to a nacreous pigment and a method of preparing the same. The nacreous pigment includes a flake substrate, a first metal oxide layer coated on the substrate, and an oxide layer coated on the first metal oxide layer and containing MgO.SiO2, and a second metal oxide layer coated on the oxide layer. The pigment exhibits high brightness, high chroma, high gloss, and multi-color effects.

8 Claims, 1 Drawing Sheet

(56) References Cited

U.S. PATENT DOCUMENTS

2006/0070552 A1 4/2006 Loch et al.
2011/0306678 A1* 12/2011 Liu et al. .................... 514/770

FOREIGN PATENT DOCUMENTS

| JP | 2005307155 | 11/2005 |
| WO | 2011020571 A1 | 2/2011 |

* cited by examiner

NACREOUS PIGMENT WITH HIGH CHROMA AND MULTIPLE COLORS AND METHOD OF PREPARING THE SAME

CROSS-REFERENCE TO RELATED APPLICATION

This application claims the benefit under 35 U.S.A. §119 of Korean Patent Application No. 10-2011-0021779, filed on Mar. 11, 2011 in the Korean Intellectual Property Office, the entirety of which is incorporated herein by reference.

BACKGROUND

1. Technical Field

The present invention relates to a nacreous pigment composed of multiple layers and, more particularly, to a technique for easily realizing a multi-color pigment, which includes alternating multiple layers with a low refractive index layer formed of MgO.SiO2 to provide various effects such as high brightness, high gloss-high chroma.

2. Description of the Related Art

A nacreous pigment is composed of multiple layers, which includes a low refractive index layer and a high refractive index layer coated on a transparent matrix.

In a conventional pigment, the low refractive index layer consists of SiO2.

Here, when the low refractive index layer has an excessively low thickness, the pigment exhibits low brightness and low gloss. Thus, the low refractive index layer formed of SiO2 is thickly coated to improve brightness and gloss characteristics of the pigment. However, as the thickness of the low refractive index layer increases, the pigment tends to suffer cracking and can realize only a single color.

BRIEF SUMMARY

One aspect of the present invention is to provide a multi-color pigment, which includes alternating layers with a low refractive index layer formed of MgO.SiO2 to realize various effects such as high brightness, high gloss-high chroma to the multi-color pigment.

Another aspect of the present invention is to provide a method of preparing a multi-color pigment, in which an added amount of MgO.SiO2 is increased to allow formation of the multi-color pigment without increasing the thickness of a low refractive index layer and to prevent defects such as cracking.

In accordance with one aspect of the invention, a method of preparing a nacreous pigment includes: (a) preparing a suspension by mixing a flake substrate including at least one of synthetic mica, natural mica, glass, iron oxide flake, alumina flake and silica flake with de-ionized (DI) water to produce a flake mixture, followed by stirring and dispersing the mixture, (b) forming a first metal oxide layer on a surface of the flake substrate by titrating a first soluble inorganic metal salt solution to the suspension, followed by hydrolyzing the first inorganic metal salt solution, (c) forming an oxide layer on a surface of the first metal oxide layer by titrating a soluble inorganic salt solution containing MgO.SiO2 to the suspension obtained by titration of the first inorganic salt solution, followed by hydrolyzing the inorganic salt solution, and (d) forming a second metal oxide layer on the surface of the oxide layer by titrating a second soluble inorganic metal salt solution to the suspension obtained by titration of the inorganic salt solution, followed by hydrolyzing the second inorganic metal salt solution.

In accordance with another aspect of the invention, a nacreous pigment includes: a flake substrate; a first metal oxide layer coated on the substrate; and an oxide layer coated on the first metal oxide layer and containing MgO.SiO2; and a second metal oxide layer coated on the oxide layer.

According to exemplary embodiments, a method of preparing a nacreous pigment includes forming a low refractive index layer using MgO.SiO2, thereby providing high brightness and high gloss to the nacreous pigment with a low thickness.

In addition, according to the embodiments, since there is no need to increase the thickness of the low refractive index layer in the pigment, the method ensures easy preparation of the pigment exhibiting high chroma and multi-color effects.

BRIEF DESCRIPTION OF THE DRAWINGS

The above and other aspects, features and advantages of the invention will be more clearly understood from the following detailed description of exemplary embodiments taken in conjunction with the accompanying drawings, in which.

DETAILED DESCRIPTION

Figure 1:
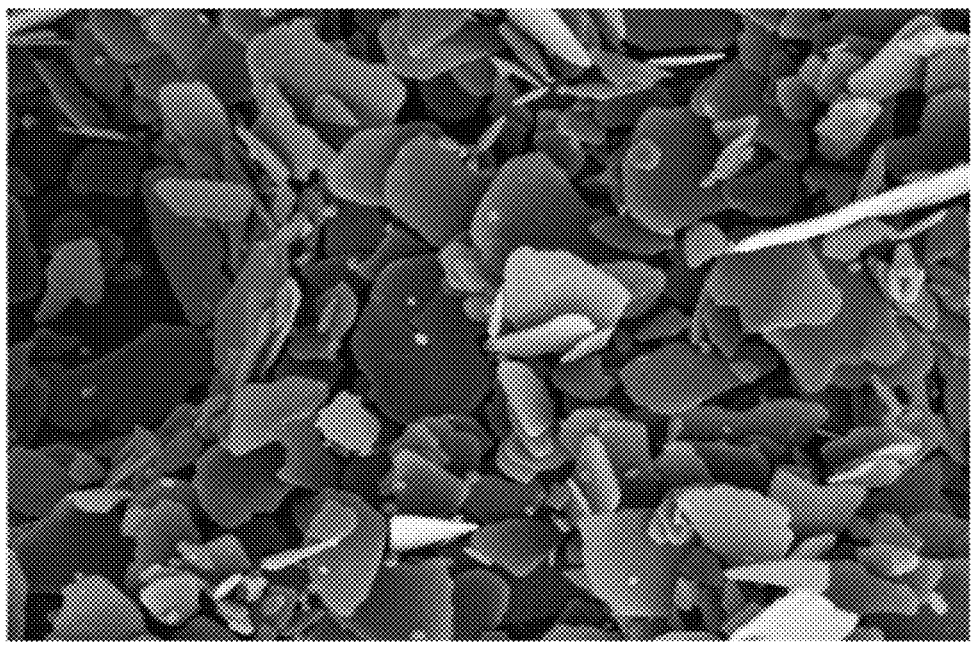
FIG. 1 is a scanning electron microscope (SEM) micrograph of an SiO2 layer of a conventional nacreous pigment, showing cracks formed therein.

Exemplary embodiments of the invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereof. Like components will be denoted by like reference numerals throughout the specification.

First, a method of preparing a nacreous pigment according to one exemplary embodiment will be described.

The method according to the embodiment includes preparing a suspension, forming a first metal oxide layer, forming an MgO.SiO2 layer, and forming a second metal oxide layer.

Preparation of Suspension

First, a suspension is prepared by mixing de-ionized (DI) water with a flake, which is used as a substrate and has a predetermined size, to produce a flake mixture, followed by stirring and dispersing the mixture.

Here, the flake substrate has a lamellar shape and may have a particle size of 5 to 250 μm. If the particle size of the flake substrate is less than 5 μm, the flake substrate gradually becomes spherical with increasing coating thickness, as a substance is coated on the surface of the flake substrate. In other words, an aspect ratio of the coating decreases, causing scattering of light by diffuse reflection, so that the same color having the same index of refraction cannot be realized.

On the contrary, if the particle size of the lamellar flake substrate exceeds 250 μm, the surface area of the substrate to be coated with a substance increases, making it difficult to constitute coating layers for realizing colors.

As the flake substrate, at least one of synthetic mica, natural mica, glass, iron oxide flake, alumina flake, and silica flake may be used.

Further, the flake substrate may be present in an amount of 5~20 percent by weight (wt %) in terms of solid content in the suspension.

If the content of the solid flake substrate is less than 5 wt %, reaction for forming a subsequent oxide layer may not occur or may insufficiently occur. If the content of the solid flake substrate exceeds 20 wt %, reaction efficiency can deteriorate.

After the suspension for the pigment is prepared, the suspension is heated to a temperature of 60~90° C. If the temperature of the heated suspension is less than 60° C., coating layers can be unevenly formed on the flake substrate and the size and shape of coated substances become very irregular. Further, if the temperature of the heated suspension exceeds 90° C., an intense reaction occurs, causing a rough coating layer to be formed on the flake substrate.

If the coating layers of the pigment are unstable, the pigment does not exhibit high chroma. Thus, it is desirable to keep the temperature of the suspension within this range. In addition, the temperature range described above may be applied to all other reactions for forming first and second metal oxide layers and an oxide layer described below.

Formation of First Metal Oxide Layer

As described above, after preparing and heating the suspension, a first metal oxide layer is coated on a surface of the flake substrate by titrating a first soluble inorganic metal salt solution to the suspension, followed by hydrolyzing the first inorganic metal salt solution.

Here, the inorganic metal salt may be composed of at least one selected from $SnCl_4$, $TiCl_4$, $TiOCl_2$, $TiOSO_4$, $FeCl_3$, $FeSO_4$, $SiCl_4$, $ZrOCl_2$, $Na_2O.SiO_2.5H_2O$, $MnCl_2$, $MgCl_2$, $AlCl_3$, $CoCl_2$, and mixtures thereof.

Further, the first inorganic metal salt solution may be added dropwise to the suspension to allow hydrolysis of the inorganic metal salt solution.

Here, the suspension may have a pH in the range of 1~9. If the suspension has a pH of less than 1, coating of the first metal oxide layer does not normally occur, and if the suspension has a pH exceeding 9, the coated substance has very uneven size and shape. As a result, the coating layer becomes very rough, causing deterioration in chroma of the pigment.

In addition, after titration of the solution at a constant pH, the suspension is refluxed for 10 to 30 minutes.

At this time, within this pH range, the suspension allows the first metal oxide layer to be coated in a ratio of 1~50% on the surface of the substrate, and reflux relieves impact relating to the pH during reaction while allowing the coating substance to be sufficiently coated on the surface of the substrate.

Accordingly, if reflux is performed for less than 10 minutes, a sufficient coating ratio cannot be obtained and impact can be applied to the flake substrate, causing cracks. If reflux is performed over 30 minutes, the flake substrate can be broken or undergo separation of the coating layer therefrom during stirring.

Formation of MgO.SiO2 Layer

With the first metal oxide layer coated on the surface of the flake substrate, the suspension is heated again to 60~90° C. Here, this temperature range is set to form an optimal coating layer, as described above.

Then, an MgO.SiO2 layer is coated on a surface of the first metal oxide layer by titrating an inorganic salt solution containing MgO.SiO2 to the heated suspension, followed by hydrolyzing the inorganic salt solution. Herein, a coating layer formed by coating MgO.SiO2 alone or together with other oxides will be referred to as an "oxide layer".

Here, the inorganic salt solution may contain at least one selected from water glass, $MgCl_2$, silicate salt, $AlCl_3$, $KCl_3$, boron, and mixtures thereof.

In this process, the suspension may have a pH of 4~14. If the pH of the suspension is less than 4, coating of the oxide layer does not normally occur, and the coated substance has very uneven size and shape, thereby causing deterioration in chroma of the pigment.

In addition, after titration of the solution with the pH of the solution maintained constant, the suspension is refluxed for 30 to 60 minutes Here, the pH of the suspension may be adjusted to allow the oxide layer to be formed on the surface of the substrate in a coating ratio of 1~30% for a high chroma-high gloss pigment and in a coating ratio of 30~90T for a multi-color pigment.

For the multi-color pigment, the coating ratio of the oxide layer in the pigment may increase up to three times that of the gloss pigment. Accordingly, the weight ratio of the oxide layer to the pigment may be different in the high gloss-high chroma pigment and than in the multi-color pigment.

For the high gloss-high chroma pigment, the coating ratio of the oxide layer may be in the range of 5 to 10 wt % with respect to the total weight of the pigment to provide optimal performance. Namely, if the coating ratio of the oxide layer is less than 5 wt % with respect to the total weight of the pigment, the pigment exhibits relatively low gloss, and if the coating ratio of the oxide layer exceeds 10 wt %, the pigment exhibits relatively low chroma.

In addition, for the multi-color pigment, the coating ratio of the oxide layer may be in the range of 5 to 35 wt % with respect to the total weight of the pigment to provide optimal performance. Namely, if the coating ratio of the oxide layer is less than 5 wt % with respect to the total weight of the pigment, the pigment exhibits a single color, and if the coating ratio of the oxide layer exceeds 35 wt %, the pigment exhibits a relatively low color-changing effect.

Hence, although the above discussion refers to 5 to 35 wt % as an advantageous coating ratio of the oxide layer in the pigment, it should be understood that the invention is not limited thereto and that the coating ratio may be changed depending on the kind of substrate, coating substances, and coating thickness.

As such, the oxide layer of the pigment according to the embodiment essentially consists of MgO.SiO2, and may further contain at least one selected from $SiO_2$, $MgO.Al_2O_3$, $K_2O.SiO_2$, $Mg_2SiO_4$, and mixtures thereof.

Such an oxide layer serves as a low refractive index layer in the pigment and may prevent cracking, which occurs in a conventional pigment having a low refractive index layer formed only of $SiO_2$.

FIG. 1 is a scanning electron microscope (SEM) micrograph of a SiO2 layer of a conventional nacreous pigment, showing cracks formed therein In FIG. 1, it can be seen that the SiO2 layer, that is, the low refractive index layer, of the conventional pigment is not densely formed and cracks are formed at the center of the layer.

On the contrary, the MgO.SiO2 layer, that is, the low refractive index ratio, of the pigment according to the embodiment does not suffer from such a problem. One example of the MgO.SiO2 layer of the pigment according to the embodiment will be described.

Figure 2:
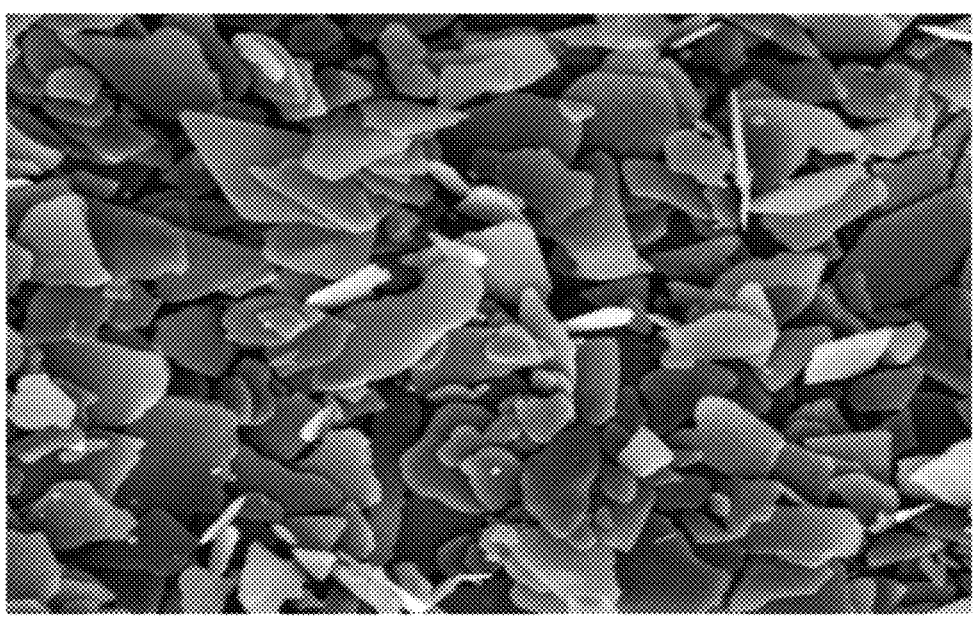
FIG. 2 is a SEM micrograph of an MgO.SiO2 layer of a nacreous pigment according to an exemplary embodiment of the present invention.

FIG. 2 is a SEM micrograph of an MgO.SiO2 layer of a nacreous pigment according to an exemplary embodiment of the invention.

In FIG. 2, it can be seen that MgO.SiO2 layer of the pigment according to the embodiment is densely and uniformly formed without cracking.

As such, use of the MgO.SiO2 layer facilitates adjustment of the thickness of the low refractive index layer in the pigment and provides high gloss, high chroma and multi-color effects to the pigment.

As described above, the nacreous pigment according to the embodiment of the invention essentially consists of the transparent thin flake substrate, the first metal oxide layer coated on the transparent flake substrate, and the oxide layer coated on the first metal oxide layer and containing MgO.SiO2.

Formation of Second Metal Oxide Layer

In this embodiment, to protect the oxide layer while improving characteristics of the pigment such as high gloss, a second metal oxide layer is coated on the oxide layer by the same process as that of forming the first metal oxide layer.

Then, the suspension having the second metal oxide layer is filtered, cleaned using de-ionized water, dried and remaining matter is then burnt and screened, thereby providing a final nacreous pigment according to the embodiment.

According to the embodiment, the nacreous pigment has an alternating seven-layer structure, which includes a high refractive index layer and a low refractive index layer on either side of the transparent substrate, thereby exhibiting various characteristics such as high gloss, high chroma, excellent multi-color effects, and the like.

Since such characteristics of the nacreous pigment are exhibited depending on the presence of the MgO.SiO2 layer, high gloss, high chroma and multi-color effects depending on use of the oxide layer will be described hereinafter.

Chroma (Colorimeter Value)

1) High Chroma-High Gloss Pigment

TABLE 1

| Kind | a* | b* |
|---|---|---|
| Comparative Example 1 | 2.64 | 38.51 |
| Comparative Example 2 | 31.58 | −8.81 |
| Comparative Example 3 | 29.90 | −39.95 |
| Comparative Example 4 | −9.56 | −40.16 |
| Comparative Example 5 | −19.43 | 13.14 |
| Comparative Example 6 | 7.83 | 48.01 |
| Example 1 | 4.14 | 42.87 |
| Example 2 | 37.10 | −13.11 |
| Example 3 | 33.16 | −44.68 |
| Example 4 | −12.87 | −44.37 |
| Example 5 | −23.30 | 15.46 |
| Example 6 | 9.33 | 59.24 |

2) Multi-Color Pigment

TABLE 2

| | 25° | | 45° | | 75° | |
|---|---|---|---|---|---|---|
| Kind | a* | b* | a* | b* | a* | b* |
| Comparative Example 7 | −0.25 | 35.36 | −1.83 | 12.97 | −2.37 | 1.25 |
| Comparative Example 8 | 26.69 | 11.01 | 11.53 | 6.95 | 2.16 | 4.35 |
| Comparative Example 9 | 7.18 | −34.65 | 7.25 | −19.69 | 3.13 | −9.12 |
| Comparative Example 10 | −21.49 | −13.36 | −7.24 | −11.56 | 0.54 | −10.43 |
| Comparative Example 11 | −25.57 | −3.59 | −9.52 | −8.11 | −1.12 | −9.21 |
| Example 7 | −0.78 | 41.62 | −3.49 | 15.59 | −4.42 | 2.65 |
| Example 8 | 29.24 | 13.05 | 13.03 | 8.75 | 3.36 | 5.87 |
| Example 9 | 8.55 | −38.7 | 8.32 | −22.88 | 4.68 | −11.52 |

TABLE 2-continued

| | 25° | | 45° | | 75° | |
|---|---|---|---|---|---|---|
| Kind | a* | b* | a* | b* | a* | b* |
| Example 10 | −25.15 | −16.19 | −8.32 | −14.78 | 1.35 | −13.40 |
| Example 11 | −29.05 | −5.89 | −12.41 | −9.35 | −2.58 | −11.64 |

Referring to Tables 1 and 2, Comparative 1 to 11 employ an SiO2 layer and Examples 1 to 11 employ an MgO.SiO2 layer.

Comparing the examples with the comparative examples, it can be seen that the pigment including the MgO.SiO2 layer has improved colorimeter values (a*, b*).

Here, since the chroma is improved with increasing absolute colorimeter values, it can be seen that the pigments of Examples have improved chroma.

Gloss

1) High Chroma-High Gloss Pigment

TABLE 3

| | 20° | 60° | 85° |
|---|---|---|---|
| Before use | | | |
| Comparative Example 12 | 95.3 | 96.2 | 93.5 |
| Comparative Example 13 | 93.9 | 96.5 | 93.9 |
| Comparative Example 14 | 96.4 | 94.2 | 93.7 |
| Comparative Example 15 | 98.1 | 94.6 | 95.1 |
| Comparative Example 16 | 93.8 | 94.6 | 91.9 |
| Comparative Example 17 | 100.2 | 97.5 | 93.8 |
| After use | | | |
| Example 12 | 100.3 | 101.9 | 97.3 |
| Example 13 | 98.2 | 99.0 | 97.7 |
| Example 14 | 101.2 | 98.1 | 98.1 |
| Example 15 | 102.4 | 98.0 | 97.3 |
| Example 16 | 97.2 | 98.7 | 95.4 |
| Example 17 | 105.2 | 103.9 | 97.9 |

2) Multi-Color Pigment

TABLE 4

| | 20° | 60° | 85° |
|---|---|---|---|
| Before use | | | |
| Comparative Example 18 | 100.1 | 94.8 | 97.5 |
| Comparative Example 19 | 95.5 | 92.9 | 98.1 |
| Comparative Example 20 | 94.7 | 91.9 | 94.5 |
| Comparative Example 21 | 98.3 | 94.1 | 99.2 |
| Comparative Example 22 | 93.5 | 92.8 | 98.6 |
| After use | | | |
| Example 18 | 104.5 | 97.3 | 101.8 |
| Example 19 | 100.9 | 97.0 | 102.5 |
| Example 20 | 99.8 | 97.1 | 100.9 |
| Example 21 | 102.1 | 97.2 | 104.8 |
| Example 22 | 100.7 | 97.1 | 104.8 |

Referring to Tables 3 and 4, Comparative 12 to 22 employ an SiO2 layer and Examples 12 to 22 employ an MgO.SiO2 layer.

Comparing the examples with the comparative examples, it can be seen that the pigment including the MgO.SiO2 layer has improved gloss.

Variation of Chroma and Gloss Depending on Content Ratio of MgO.SiO2

1) High Chroma High Gloss Pigment

TABLE 5

| Chroma | Content ratio (wt %) | a* | b* |
|---|---|---|---|
| Comparative Example 23 | 3 | 0.90 | −1.25 |
| Comparative Example 24 | 4 | −0.49 | 1.34 |
| Example 23 | 5 | 4.14 | 42.87 |
| Example 24 | 10 | 9.33 | 59.24 |
| Example 25 | 20 | 23.30 | −15.46 |
| Example 26 | 30 | 33.16 | −44.68 |
| Example 27 | 35 | 37.10 | −13.11 |
| Example 25 | 36 | −1.28 | 0.91 |

TABLE 6

| Gloss | Content ratio (wt %) | 20° | 60° | 85° |
|---|---|---|---|---|
| Comparative Example 26 | 3 | 83.9 | 86.5 | 81.9 |
| Comparative Example 27 | 4 | 85.3 | 90.2 | 85.5 |
| Example 28 | 5 | 98.2 | 99.0 | 97.7 |
| Example 29 | 10 | 100.3 | 101.9 | 97.3 |
| Example 30 | 20 | 101.2 | 98.1 | 98.1 |
| Example 31 | 30 | 102.4 | 98.0 | 97.3 |
| Example 32 | 35 | 105.2 | 103.9 | 97.9 |
| Comparative Example 28 | 36 | 80.9 | 81.5 | 73.9 |

2) Multi-Color Pigment

TABLE 7

| Chroma | Content ratio (wt %) | 25° a* | 25° b* | 45° a* | 45° b* | 75° a* | 75° b* |
|---|---|---|---|---|---|---|---|
| Comparative Example 23 | 3 | −0.25 | 2.37 | −0.13 | 0.57 | −0.31 | 0.27 |
| Comparative Example 24 | 4 | −0.49 | 1.34 | −0.49 | 1.34 | −0.49 | 1.34 |
| Example 23 | 5 | −0.78 | 41.62 | −3.49 | 15.59 | −4.42 | 2.65 |
| Example 24 | 10 | −25.15 | −16.19 | −8.32 | −14.78 | 1.35 | −13.40 |
| Example 25 | 20 | −29.05 | −5.89 | −12.41 | −9.35 | −2.58 | −11.64 |
| Example 26 | 30 | 8.55 | −38.7 | 8.32 | −22.88 | 4.68 | −11.52 |
| Example 27 | 35 | 29.24 | 13.05 | 13.03 | 8.75 | 3.36 | 5.87 |
| Comparative Example 25 | 36 | 2.57 | 1.38 | 0.27 | 2.39 | 1.84 | 0.25 |

TABLE 8

| Gloss | Content ratio (wt %) | 20° | 60° | 85° |
|---|---|---|---|---|
| Comparative Example 26 | 3 | 70.8 | 80.7 | 77.4 |
| Comparative Example 27 | 4 | 85.3 | 90.2 | 85.5 |
| Example 28 | 5 | 99.8 | 97.1 | 100.9 |
| Example 29 | 10 | 100.9 | 97.0 | 102.5 |
| Example 30 | 20 | 102.1 | 97.2 | 104.8 |
| Example 31 | 30 | 100.7 | 97.1 | 104.8 |
| Example 32 | 35 | 104.5 | 97.3 | 101.8 |
| Comparative Example 28 | 36 | 85.1 | 83.9 | 89.5 |

Referring to Tables 5 to 8, it can be seen that, in Comparative Examples 23, 24, 26 and 27 having less than 5 wt % of the MgO.SiO2 layer, the MgO.SiO2 layer has an excessively low thickness, thereby providing an unsatisfactory coating ratio of the layers.

That is, it can be estimated that the low thickness of the MgO.SiO2 layer provides insufficient coverage with respect to an underlying layer, so that the pigments of the comparative examples have a rough surface causing diffuse reflection, thereby providing relatively low chroma and gloss. In addition, by the same principle as described above, the comparative examples do not provide multi-color effects.

For the pigments of the comparative examples wherein the MgO.SiO2 layer is present in an amount exceeding 35 wt %, it can be seen that the MgO.SiO2 layer has an excessively high thickness and requirements for the coating ratio of the layers cannot be fulfilled, causing insufficient light refraction at the respective layers. As a result, the pigments of the comparative examples provide undesired colors and relatively low chroma.

On the other hand, for Examples 23 to 32 wherein the content of the MgO.SiO2 layer is in the range according to the present invention, all of the pigments have satisfactory chroma and gloss, as shown in Table 1 to 4.

As described above, the method of preparing a nacreous pigment according to the embodiment includes forming a low refractive index layer using MgO.SiO2, thereby providing high brightness and high gloss to the nacreous pigment with a low thickness.

In addition, since there is no need there is no need to increase the thickness of the low refractive index layer in the pigment, the method ensures easy preparation of the pigment exhibiting high chroma and multi-color effects.

Although some embodiments have been described herein, it should be understood by those skilled in the art that these embodiments are given by way of illustration only, and that various modifications, changes, and alterations can be made without departing from the spirit and scope of the invention. Therefore, the scope of the invention should be limited only by the accompanying claims and equivalents thereof.

What is claimed is:

1. A method of preparing a nacreous pigment, comprising:

preparing a suspension by mixing a flake substrate containing at least one of synthetic mica, natural mica, glass, iron oxide flake, alumina flake and silica flake with de-ionized (DI) water to produce a flake mixture, followed by stirring and dispersing the mixture;

forming a first metal oxide layer on a surface of the flake substrate by titrating a first soluble inorganic metal salt solution to the suspension, followed by hydrolyzing the first soluble inorganic metal salt solution;

forming an oxide layer on a surface of the first metal oxide layer by titrating a soluble inorganic salt solution containing MgO.SiO2 to the suspension obtained by titration of the first soluble inorganic metal salt solution, followed by hydrolyzing the soluble inorganic salt solution, wherein the suspension is adjusted to have a pH in the range of more than 4 to 14 and is refluxed for 30 to 60 minutes after titration of the corresponding solution; and forming a second metal oxide layer on the surface of the oxide layer by titrating a second soluble inorganic metal salt solution to the suspension obtained by titration of the soluble inorganic salt solution, followed by hydrolyzing the second soluble inorganic metal salt solution.

2. The method of claim 1, wherein the suspension prepared by mixing the flake substrate with de-ionized water has a solid content of 5 to 20 wt %.

3. The method of claim 1, wherein the suspension is maintained at a temperature of 60 to 90° C. during formation of the first metal oxide layer, the oxide layer and the second metal oxide layer.

4. The method of claim 1, wherein each of the first and second soluble inorganic metal salt solutions comprises at least one selected from $SnCl_4$, $TiCl_4$, $TiOCl_2$, $TiOSO_4$, $FeCl_3$, $FeSO_4$, $SiCl_4$, $ZrOCl_2$, $Na_2O \cdot SiO_2 \cdot 5H_2O$, $MnCl_2$, $MgCl_2$, $AlCl_3$, $CoCl_2$, and mixtures thereof.

5. The method of claim 1, wherein the soluble inorganic salt solution comprises at least one selected from water glass, $MgCl_2$, silicate salt, $AlCl_3$, $KCl_3$, boron, and mixtures thereof.

6. The method of claim 5, wherein the oxide layer comprises at least one selected from $SiO_2$, $MgOAl_2O_3$, $K_2O \cdot SiO_2$, $Mg_2SiO_4$, and mixtures thereof.

7. The method of claim 1, wherein the oxide layer is present in an amount of 5 to 35 wt % with respect to a total amount of the pigment.

8. The method of claim 1, wherein, during formation of the first metal oxide layer or formation of the second metal oxide layer, the suspension is adjusted to have a pH in the range of 1 to 9 and is refluxed for 10 to 30 minutes after titration of the corresponding solution.

\* \* \* \* \*